J. N. ELLENBURG.
SEPARATOR FOR SEED COTTON.
APPLICATION FILED APR. 22, 1915.
1,216,673.
Patented Feb. 20, 1917.
3 SHEETS—SHEET 1.
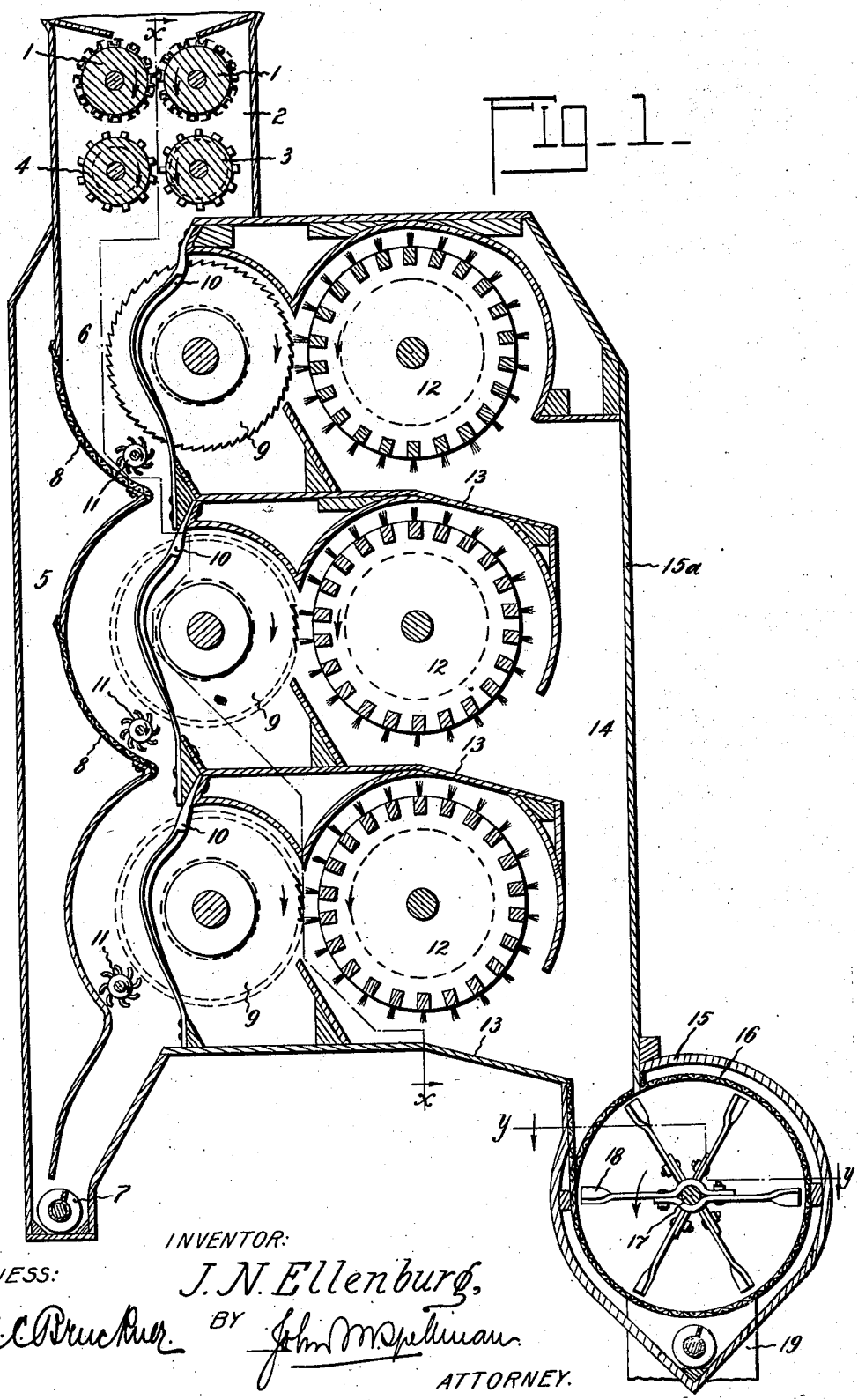

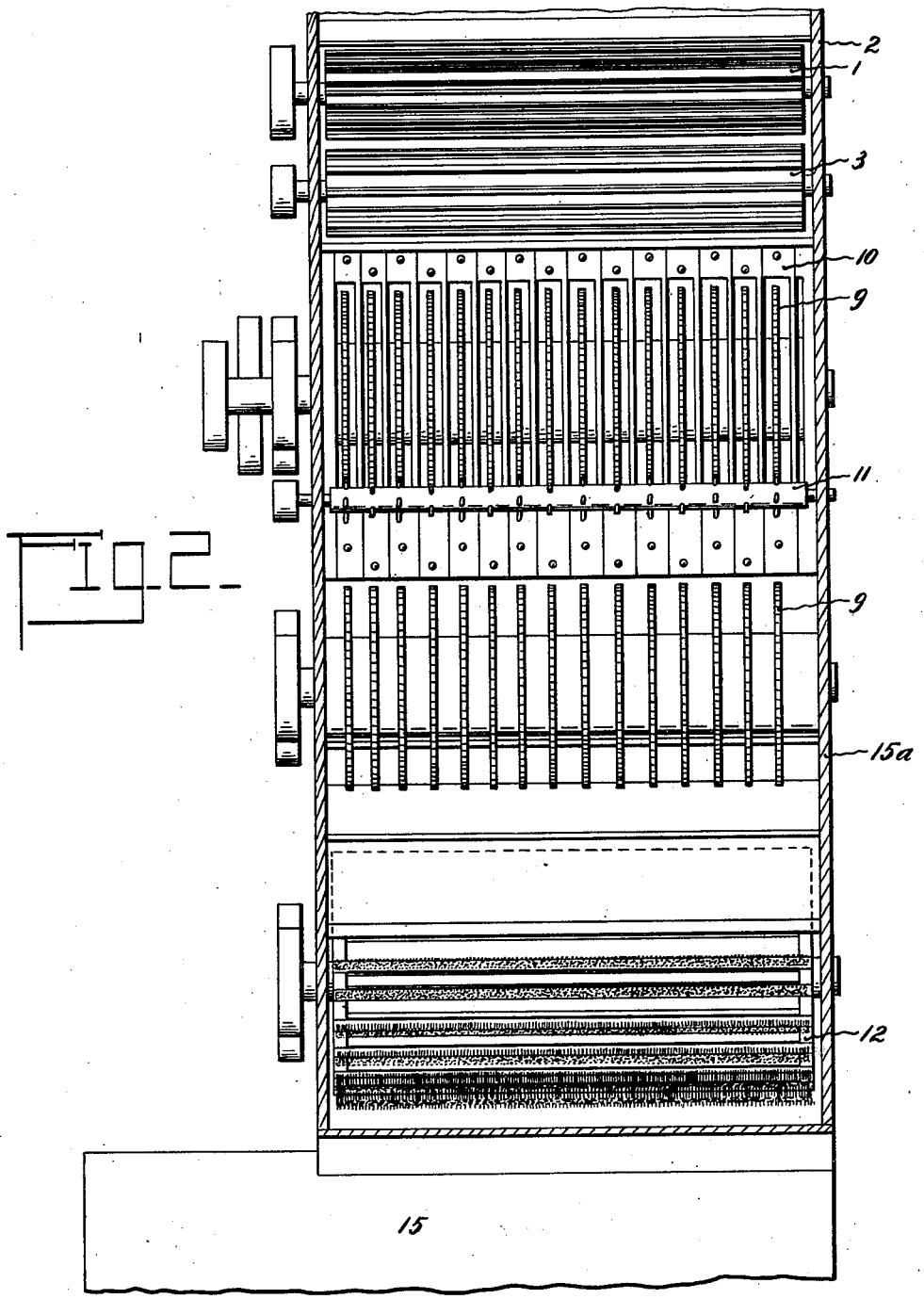

J. N. ELLENBURG.
SEPARATOR FOR SEED COTTON.
APPLICATION FILED APR. 22, 1915.
1,216,673.
Patented Feb. 20, 1917.
3 SHEETS—SHEET 3.
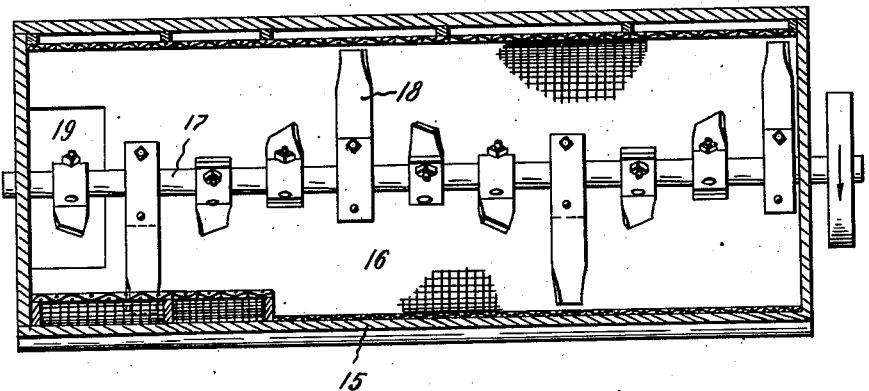
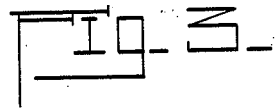
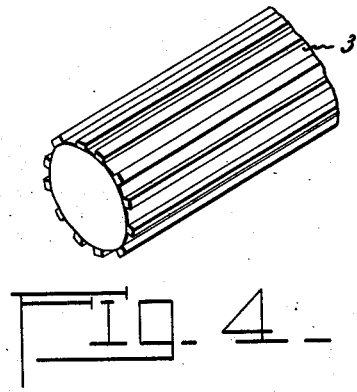
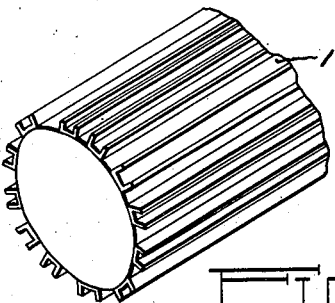
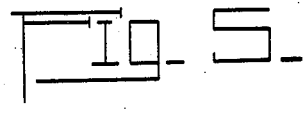
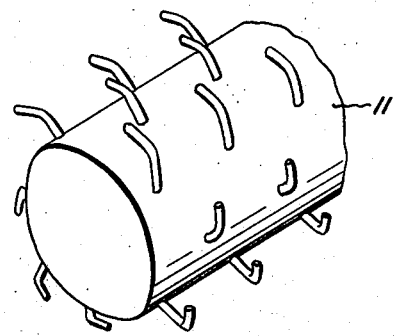
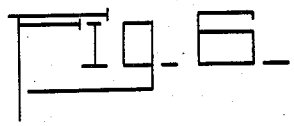
WITNESS
INVENTOR
J. N. Ellenburg,
BY
ATTORNEY

UNITED STATES PATENT OFFICE.

JOE N. ELLENBURG, OF McKINNEY, TEXAS, ASSIGNOR OF ONE-FIFTH TO JOE F. DULANEY, ONE-FIFTH TO JIM THOMPSON, ONE-FIFTH TO GEORGE THOMPSON, AND ONE-FIFTH TO WILLIAM T. HARTMAN, ALL OF McKINNEY, TEXAS.

SEPARATOR FOR SEED-COTTON.

1,216,673. Specification of Letters Patent. Patented Feb. 20, 1917.

Application filed April 22, 1915. Serial No. 23,013.

*To all whom it may concern:*

Be it known that I, JOE N. ELLENBURG, a citizen of the United States, residing at McKinney, in the county of Collin and State of Texas, have invented certain new and useful Improvements in Separators for Seed-Cotton, of which the following is a specification.

My invention has relation to a machine for separating seed cotton from hulls and extraneous dirt prior to its presentation to the gins and in such connection it relates more particularly to a hulling mechanism comprising essentially a saw cylinder coöperating with huller ribs, a picker roll and a lint removing brush, in the separation of the seed cotton from the hulls, stems and extraneous dirt.

Heretofore in the preparation of cotton for the ginning operation, the cotton bolls were, when necessary, first passed through a boll breaker and thereafter through a cleaner and thence to a gin. Where the cotton was of a hully nature the gin was of a construction known as a huller gin. In such a gin the cotton was fed through a picker roll mechanism before entering the roll box of the gin.

By my present invention there is provided a hulling mechanism designed to act upon the cotton prior to its passage through the cleaner and when a boll breaker is necessary, immediately after the cotton has been passed through said boll breaker and before it is passed through the cleaner. And by my present invention there is provided a novel hulling mechanism comprising a saw cylinder, huller ribs and a picker roll coöperating with a revolving brush designed to operate upon the saws to remove the lint and seed after the cotton has been subjected to the saws, ribs and picker roll coöperating to remove the hulls. Again by my present invention there is provided a series of hulling mechanisms each consisting of a saw cylinder, huller ribs and picker roll coöperating with a lint removing brush, the mechanisms being in superposed relationship with the huller mechanisms discharging to a common channel or passage way and the brushes discharging to a common lint flue or passageway leading to and discharging in the cleaning mechanism.

In one aspect of my invention the location of the hulling mechanism in the chain of mechanisms leading up to the gin is broadly new and constitutes one feature of my device. In another aspect of my present invention the use of a saw cylinder in conjunction with picker roll and huller ribs coöperating to form a hulling mechanism is also broadly new and in a third aspect of the invention the use of superposed hulling mechanisms whereby the hully cotton is subjected to a continuous series or chain of hulling operations prior to the discharge of the hulls and prior to the entrance of the separated cotton into the cleaner is likewise broadly new.

The nature and scope of my invention will be more fully understood from the following description taken in connection with the accompanying drawings forming part hereof, in which—

Figure 1, is a vertical sectional view of a boll breaker and huller embodying main features of my invention, the cleaner into which the lint chamber of the huller discharges being also illustrated in section.

Fig. 2, is a transverse sectional view taken on the line $x$—$x$ of Fig. 1.

Fig. 3, is a horizontal sectional view of the cleaner, the section being taken on line $y$—$y$ of Fig. 1.

Fig. 4, is a perspective view of one of the boll breaker rolls of the machine.

Fig. 5, is a perspective view of one of the feeder rolls, and

Fig. 6, is a perspective view of one of the picker rolls.

Referring to the drawings 1, 1 are the feeder rolls revolving in the upper end of a hopper 2. Below these rolls 1 are arranged the two boll breaker rolls 3 and 4. These boll breaker rolls revolve to force the bolly cotton through the hopper, the roll 4 revolving at a higher speed than its coöperating roll 3. By reason of this difference in speed of rotation the cotton bolls are subjected to a combined crushing and elongating or stretching during their passage through the boll breaker.

The hopper 2 terminates at its base in a vertically extending passage way divided by alternate solid and screen sectioned partition into two channels 5 and 6, at the base of which a conveyer screw 7 rotates to convey the hulls and trash from the machine. The channel 5 receives loose dirt or motes passing through the curved screen section 8 during the operation of the machine and the other channel 6 forms a passage way for the hulls as hereinafter more particularly described.

The curved screens 8 each coöperate as a breast with a saw cylinder 9, huller ribs 10 and a picker roll 11. The saws of the saw cylinders 9 are relatively widely spaced apart and have on their periphery teeth relatively coarser than the teeth of the ordinary gin saw. The ribs 10 correspond in general shape and contour to the ordinary huller ribs of a gin but are larger and more widely spaced than are said ginning or seeding ribs. It follows that when the hully cotton comes in contact with the periphery of a saw cylinder 9 the lint and seed are drawn between the ribs 10 but all or a considerable portion of the hulls are separated by the ribs 10. The coaction of ribs 10 and cylinder 9 is accelerated by the picker rolls 11 which constantly revolve the hulls and hully cotton and present the hully cotton to the underneath portion of the saws. At the rear of the periphery of each saw cylinder 9 is arranged a revolving brush cylinder 12 the brushes of which are designed to remove the seed cotton and lint from the periphery of the saws after the cotton and lint has been drawn between ribs 10. Each of the brush cylinders 12 deposits the seed cotton upon a platform or floor 13 discharging into a vertical flue or chamber 14. The base of this flue or chamber 14 opens into the top of the casing 15 of a cleaning machine.

In the preferred form of structure there are a plurality of separating mechanisms in superposed relationship within a common casing 15ª. In this form, after the cotton is partly hulled and separated in the first mechanism in series, the hulls are passed downward to the second mechanism in series and the hulling and separating operations are continued by the coacting breast, saw cylinder, ribs and picker roll of said second mechanism. The hulls and hully cotton escaping from the second mechanism are treated in the third mechanism and so on until the hulls, freed from the cotton, are deposited in the trough in which the trash conveyer 7 rotates.

At the opposite end of the machine, each brush cylinder 12 removes the seed cotton and lint from its coöperating saw cylinder 9 and discharges the same into one common flue 14.

The cotton from flue 14 passes through casing 15 into the interior of the cleaner. This interior is in the form of a screened cylinder 16 in which revolves a shaft 17 carrying paddles or blades 18 which press the cotton over the screened surface 16 and work the cotton through the cleaner with a worm like or screw action, wholly mechanical and wholly unassisted by suction or air pressure, to the outlet 19 from the cleaner.

Having thus described the nature and objects of my invention what I claim as new and desire to secure by Letters Patent, is,—

1. In a machine of the character described, a plurality of superposed hulling mechanisms, a continuous passageway divided into two channels whereof one conducts the hully cotton to successive hulling mechanisms and whereof the other receives the loose dirt from the cotton, the partition dividing said passageway comprising alternate solid and screen sections, and a plurality of picker rolls arranged in the channel for the cotton and adjacent to a screen section of said partition.

2. In a machine of the character described, a plurality of superposed hulling mechanisms, a continuous passageway divided into two channels whereof one conducts the hully cotton to successive hulling mechanisms and whereof the other receives the loose dirt from the cotton, the partition dividing said passageway comprising alternate solid and screen sections, and a plurality of picker rolls arranged in the channel for the cotton and each adjacent to a screen section of said partition in combination with a flue common to all the huller mechanisms and arranged to receive the cotton discharged from said huller mechanisms.

In testimony whereof I have signed my name to this specification in the presence of a subscribing witness.

JOE N. ELLENBURG.

Witness:
G. C. WALDROP.